United States Patent
Ahn et al.

(10) Patent No.: US 12,534,182 B2
(45) Date of Patent: Jan. 27, 2026

(54) OPTIMIZED SEALING PROCESS

(71) Applicant: The Boeing Company, Arlington, VA (US)

(72) Inventors: Jonathan Young Ahn, Seattle, WA (US); Shane Edward Arthur, Kirkland, WA (US); Joseph D. Anderson, Olalla, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/540,620

(22) Filed: Dec. 14, 2023

(65) Prior Publication Data

US 2025/0196994 A1    Jun. 19, 2025

(51) Int. Cl.
| | |
|---|---|
| *F16J 15/14* | (2006.01) |
| *B64C 3/26* | (2006.01) |
| *B64C 3/34* | (2006.01) |
| *B64F 5/10* | (2017.01) |

(52) U.S. Cl.
CPC ............... *B64C 3/26* (2013.01); *B64C 3/34* (2013.01); *B64F 5/10* (2017.01); *F16J 15/14* (2013.01)

(58) Field of Classification Search
CPC .... F16J 15/14; B64C 3/26; B64C 3/34; B64F 5/10
See application file for complete search history.

(56) References Cited

U.S. PATENT DOCUMENTS

| | | | | |
|---|---|---|---|---|
| 4,625,979 A | * | 12/1986 | Inciong | F16J 15/123 29/888.3 |
| 4,993,723 A | * | 2/1991 | Sroka | F16J 15/123 277/596 |
| 5,615,898 A | * | 4/1997 | Clark | F16J 15/122 277/649 |
| 5,869,814 A | * | 2/1999 | Scoles | B29C 70/24 219/618 |
| 5,882,729 A | * | 3/1999 | Kahl | H05K 9/0015 174/370 |
| 6,073,938 A | * | 6/2000 | Abe | F16J 15/104 277/654 |
| 11,543,029 B2 | | 1/2023 | Wu et al. | |
| 2012/0276362 A1 | * | 11/2012 | Denavit | F16B 11/006 156/60 |
| 2021/0262568 A1 | * | 8/2021 | Wu | B64C 3/34 |

(Continued)

*Primary Examiner* — Vishal A Patel
(74) *Attorney, Agent, or Firm* — Kolitch Romano Dascenzo Gates LLP

(57) ABSTRACT

A method of sealing a component assembly includes applying onto a first component a first sealant bead having, in a cross-sectional view, a first width and a first height, wherein the first width is greater than the first height. The method also includes applying over the first sealant bead a second sealant bead having, in the cross-sectional view, a second width and a second height, thereby generating a sealant stack. The second width is equal to or smaller than the second height and the second width is smaller than the first width. The method additionally includes arranging over the sealant stack a second component, such that the sealant stack is positioned between the first and second components. Furthermore, the method includes fastening the second component to the first component with the sealant stack squeezed therebetween to generate a fluid-tight seal via rheological flow of the first and second sealant beads.

23 Claims, 3 Drawing Sheets

(56) References Cited

U.S. PATENT DOCUMENTS

| | | | |
|---|---|---|---|
| 2021/0316839 A1* | 10/2021 | Albright | B29C 45/0046 |
| 2022/0325142 A1* | 10/2022 | Moyer | B64C 7/00 |
| 2023/0081133 A1 | 3/2023 | Albright | |

* cited by examiner

OPTIMIZED SEALING PROCESS

INTRODUCTION

The present disclosure relates to an optimized fluid-tight sealing process, such as for an interface between adjacent components.

A sealing process typically includes application of a sealing substance (sealant) to block the passage of fluids, dust, sound, and heat through openings in materials. Sealing of an assembly typically creates a mechanical closure at an interface between adjacent components or substrates. Sealants may be weak or strong, flexible or rigid, temporary or permanent. Although most sealants are technically not adhesives, some sealants have adhesive or structural qualities.

Sealants may have electrical isolation or conduction properties and may provide thermal and/or acoustical insulation. Sealants may also be used for simple smoothing of surface transitions or filling of gaps between two or more components. Sealants are often called upon to perform several such functions at once. While sealants typically do not possess great strength, they may be particularly effective in waterproofing assemblies by keeping moisture inside or outside the components or assemblies in which they are used.

As a sealant fills a gap between components, it forms a barrier as a result of the sealant's physical properties and by its adhesion to adjacent components. Once applied, a sealant is intended to maintain adhesion and its sealing properties for a requisite timeframe when subjected to expected service and environmental conditions. To achieve requisite performance properties, sealant formulations and application processes are carefully developed.

SUMMARY

A method of sealing a component assembly includes providing a first component having a first outer surface. The method also includes applying onto the first component a first sealant bead having, in a cross-sectional view, a first width and a first height. The first width is greater than the first height. The method additionally includes applying over the first sealant bead a second sealant bead having, in the cross-sectional view, a second width and a second height, thereby generating a sealant stack. The second width is equal to or smaller than the second height and the second width is smaller than the first width. The method also includes arranging over the generated sealant stack a second component having a second outer surface, such that the sealant stack is positioned between the first outer surface and the second outer surface. Furthermore, the method includes fastening the second component to the first component with the sealant stack squeezed therebetween. The resultant component assembly is fluid-tight sealed via rheological flow of the first and second sealant beads when the second component is fastened to the first component.

The first height may be equal to or smaller than the second height.

The first sealant bead and the second sealant bead may be formed from a common polymeric material.

The second width may be directly proportional to viscosity of the polymeric material.

Specifically, the subject polymeric material may be polysulfide.

At least one of the first and second outer surfaces may be characterized by an uneven profile, thereby generating an irregular gap between the first and second components. The sealant stack may then be arranged in the irregular gap, and the second sealant bead may facilitate filling the irregular gap generated by the uneven profile to seal the component assembly.

Fastening the second component to the first component may include installing, in the cross-sectional view, and tightening a first fastener on one side of the first sealant bead and a second fastener on an opposite side of the first sealant bead.

The fluid-tight sealing of the component assembly may be characterized by an absence of redundant fillet and fairing seals between the first and second components.

The component assembly may be part of an aircraft wing defining a fuel reservoir.

The first component may be either an aircraft wing skin or an aircraft wing spar and the second component may then be the other aircraft wing part.

A fay-sealed component assembly employing the above-disclosed sealant stack squeezed between the first and second components to seal an irregular gap therebetween is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
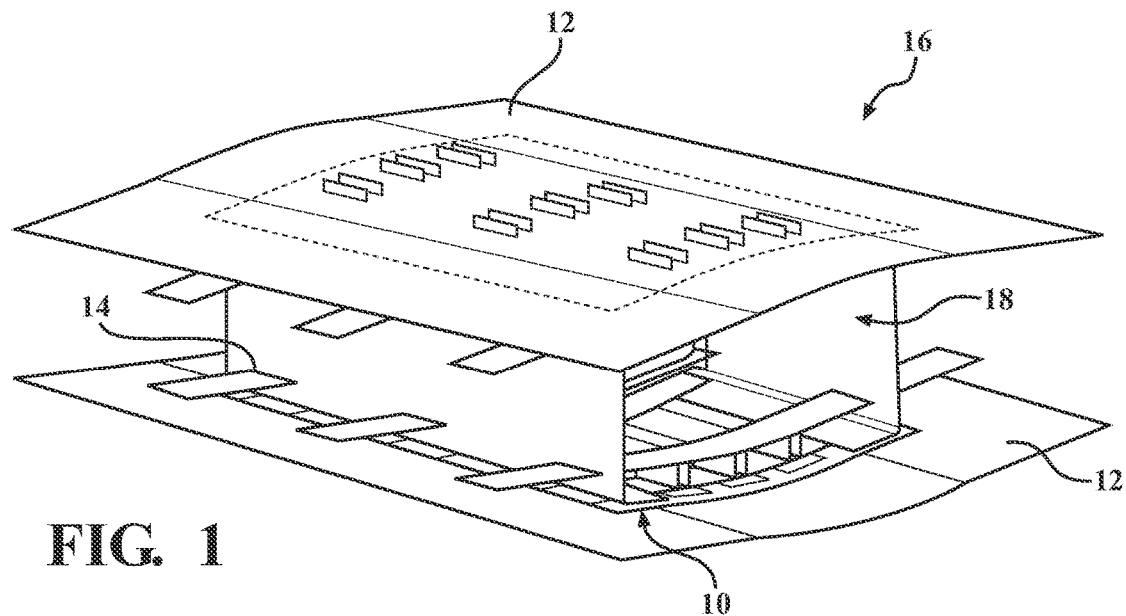
FIG. 1 is a schematic perspective view of fay-sealed component assembly, specifically depicted as part of an aircraft wing with one of the components shown as an aircraft wing skin and the other component shown as an aircraft wing spar, according to the present disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components, FIG. 1 shows an assembly 10 having adjacent components—a first component 12, and a second component 14. The assembly 10 includes a fay-sealed joint or interface 10A (shown in FIG. 1) between components 12 and 14. The fay-sealed interface 10A may be configured as a fluid-tight seal, as will be described in detail below. Generally, the first component 12 and the second component 14 are fastened and fixed to each other, such as via appropriate fasteners, for example, bolts, rivets, etc., or being clamped via appropriate means to generate a robust assembly. Although not limited to the specific example shown in FIG. 1, the component assembly 10 may be part of an aircraft wing 16 defining an internal fuel reservoir 18. As further shown in the embodiment of FIG. 1, the first component 12 may be an aircraft wing skin while the second component 14 may be an aircraft wing spar (shown with a flanged configuration), or vice versa.

Figure 2:
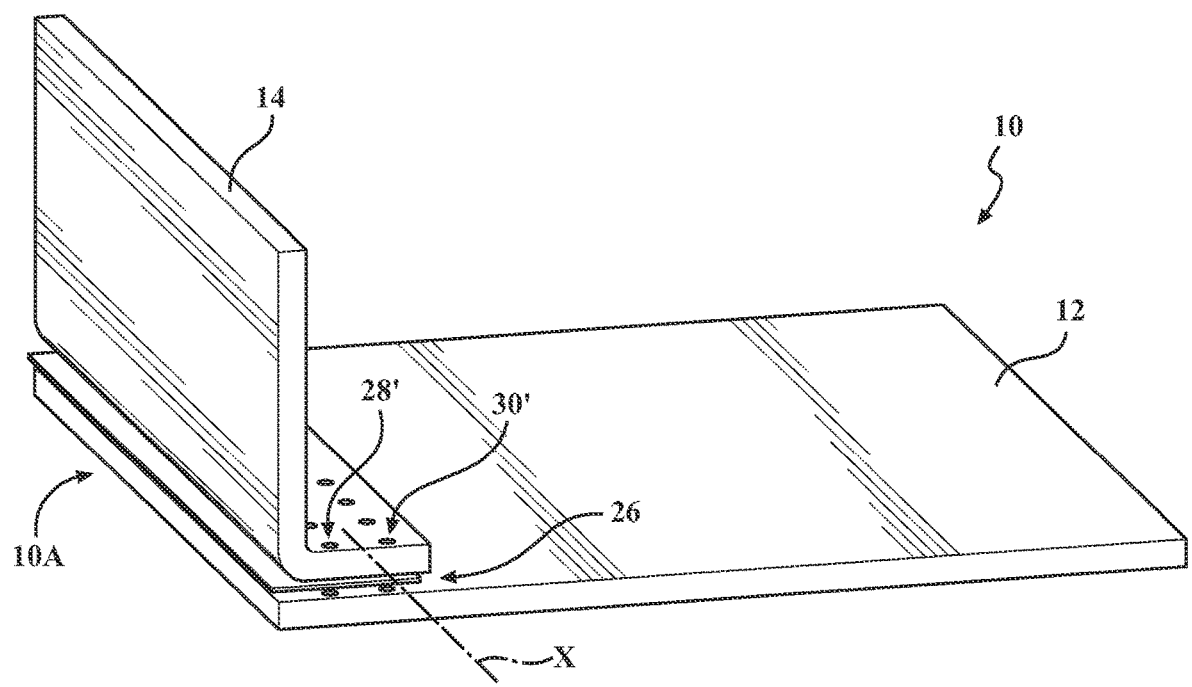
FIG. 2 is a schematic close-up cross-sectional front view of the component assembly shown in FIG. 1, depicting a sealant stack including two sealant beads having dissimilar dimensions arranged in the interface between the assembly components, according to the disclosure.
Figure 3:
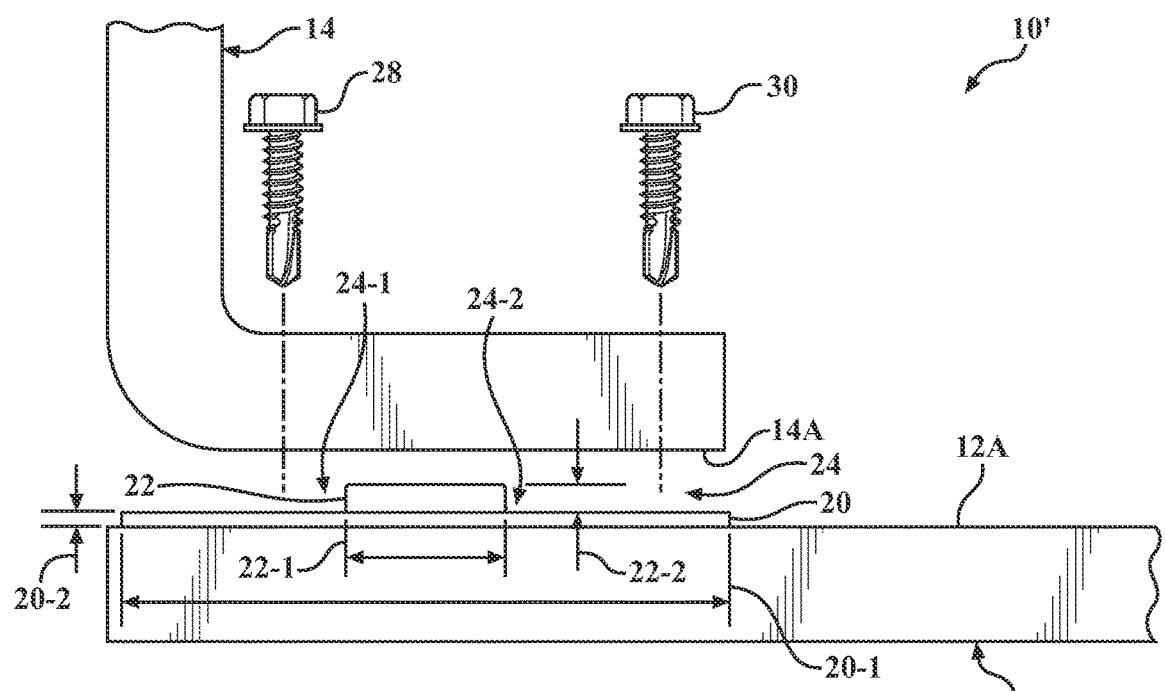
FIG. 3 is a schematic close-up cross-sectional front view of the component assembly shown in FIG. 1, depicting two rows of fasteners arranged on opposite sides of and compressing the sealant stack, according to the disclosure.

As shown in FIG. 2, the first component 12 may be a bottom component and includes a first or top outer surface 12A. The component assembly 10 also includes a first sealant bead 20 applied onto the first component 12, specifically to the first outer surface 12A. As may be seen in a cross-sectional view shown in FIG. 3, the first sealant bead 20 is defined by a first width 20-1 and a first height 20-2. The magnitude of the first width 20-1 is greater than the magnitude of the first height 20-2. The first component 12 also includes a second sealant bead 22 applied over or on top of the first sealant bead 20. In the cross-sectional view shown in FIG. 3, the second sealant bead 22 is defined by a second width 22-1 and a second height 22-2. As shown in FIG. 3, the second sealant bead 22 applied over the first sealant bead 20 generates a sealant stack 24. The first component 12 with the sealant stack 24 arranged thereon constitutes a component subassembly 10' (shown in FIGS. 3 and 4) in advance of fastening the second component 14 thereto and thereby generating the final assembly 10.

With reference to the sealant stack 24 shown in FIG. 3, the magnitude of the second width 22-1 is equal to or smaller (i.e., no greater) than the magnitude of second height 22-2. Additionally, the second width 22-1 is smaller than the first width 20-1. Furthermore, the magnitude of first height 20-2 may be equal to or smaller than the magnitude of the second height 22-2. The first sealant bead 20 and the second sealant bead 22 may be formed from a common polymeric material, such as polysulfide, to withstand prolonged immersion in a liquid, such as aircraft fuel. The magnitude of the second width 22-1 may be directly proportional to the viscosity of the selected bead material. Additionally, the proportion of dimensions, i.e., the respective widths and heights, of the first and second sealant beads 20, 22 may likewise be selected in relation to the sealant viscosity. For example, a wider second width 22-1 may be selected with a lower viscosity sealant. The stacked sealant beads 20, 22 form a continuous band of sealant around the fay-sealed interface 10A between components 12 and 14.

As shown, the second component 14 may be arranged as a top component and includes a second or bottom outer surface 14A. In the component assembly 10, the sealant stack 24 is positioned between the first outer surface 12A and the second outer surface 14A. A fluid-tight seal 26 (shown in FIG. 1) is generated in the component assembly 10 as the second component 14 is fastened to the first component 12 with the sealant stack 24 squeezed therebetween. As the first and second components 12, 14 are fastened together, most of the sealant material remains therebetween. However, as the joint is sealed, some of the sealant material, primarily of the first sealant bead 20, may be squeezed out of the interface 10A.

Generally, sealant material is a shear-thickening rheological fluid, i.e., the sealant increases in viscosity with the rate of shear strain. In other words, the sealant material becomes less viscous and less compressible as it is subjected to a load inside a component assembly interface. In the event sealant is trapped between adjacent components, a hydrolock condition may occur, thereby distorting or pillowing the component structure. To avoid hydrolocking and distortion of the component structure in the joint, width 22-1 of the second sealant bead 22 is smaller than width 20-1 of the first sealant bead 20, while the height 22-2 is greater than the first height 20-2. Also, the width 20-1 of the first sealant bead 20 is greater than its height 20-2. The subject relative dimensions of the sealant beads 20, 22 facilitate reliable squeeze out of some sealant material while also accounting for gap variation (to be discussed in detail below) and avoiding hydrolocking and distortion of the component structure in the joint. Additionally, the total height of the sealant stack 24 may be greater than the maximum height of the gap in the interface 10A to permit reliable filling of the gap.

The component assembly 10 is thus sealed via rheological flow of the first and sealant beads 20, 22. Specifically, in the cross-sectional view shown in FIG. 3, the second component 14 may be fastened to the first component 12 via a first fastener 28 on one side (shown as the left side) 24-1 of the sealant stack 24 and a second fastener 30 on an opposite side (shown as the right side) 24-2 of the sealant stack. Moreover, in the component assembly 10 side or top view along a longitudinal axis X (shown in FIG. 2), the first fastener 28 may be one of a first row 28' of fasteners and the second fastener 30 may be one of a second row 30' of fasteners arranged along the stacked sealant beads 20, 22 to generate the fluid-tight seal 26 assembly.

Figure 4:
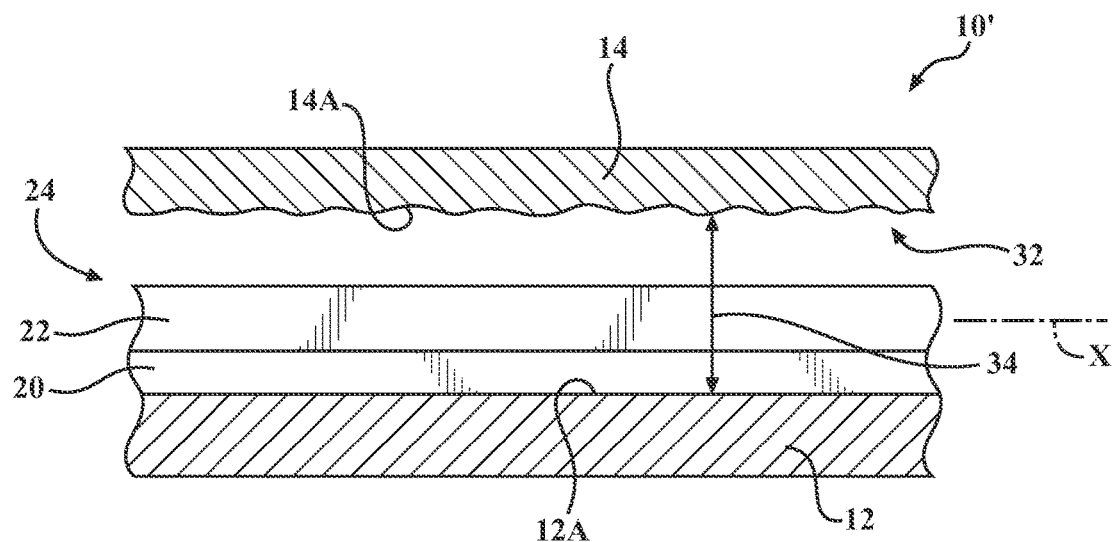
FIG. 4 is a schematic close-up cross-sectional side view of the component assembly shown in FIG. 1, depicting the sealant stack arranged in an irregular gap between the first and second components as a result of one of the components having an outer surface with an uneven profile, according to the disclosure.

As shown in FIG. 4, at least one of the first and second outer surfaces 12A, 14A may be characterized by an uneven profile 32, either in the cross-sectional view or along the longitudinal axis X. Such an uneven profile 32 of either of the first and second outer surfaces 12A, 14A may generate an irregular or inconsistent gap 34 between the first and second components 12, 14, i.e., gap variation in the interface 10A. The fluid-tight seal 26 may be maintained despite the irregular gap 34 via the described configuration of the sealant stack 24 arranged in therein, specifically because of the rheological flow of the first and sealant beads 20, 22.

Moreover, the fluid-tight seal 26 of component assembly 10 may be maintained even in the absence of redundant fillet and fairing seals, which are common in the art, between the first and second components 12, 14. Hence, the component assembly 10 may be configured as an un-faired and un-filleted fay-sealed assembly.

The magnitude of irregular gap 34 may be used to determine ranges of the first and second sealant bead heights 20-2, 22-2. Nominal gap thickness may be generally taken up by the first sealant bead 20, while gap variation and surface irregularities may be taken up by the second sealant bead 22. For example, the first sealant bead height 20-2 may be equal to the average gap thickness. The second sealant bead height 22-2 may be equal to the maximum possible gap thickness anywhere in the joint. Ratios between widths and heights of the first and second sealant beads 20, 22 may be related to the subject sealant material's rheological change in viscosity under load. For example, a sealant material with lower viscosity under a specific load would permit use of a taller second sealant bead 22 relative to its width 22-1 and a taller first sealant bead 20 relative to its width 20-1. Also, in such an embodiment, the width 22-1 of the second sealant bead 22 may be closer to 1:1 ratio relative to the magnitude of its height 22-2.

The sealant stack 24 may be instrumental in facilitating rheological flow of the first sealant bead 20 into the wider spaces within the irregular gap 34 and controlled squeezing of the first sealant bead out of the narrower spaces. Meanwhile, the second sealant bead 22 is instrumental in filling the general space along the longitudinal axis X between the first and second components 12, 14. For example, as the sealant stack 24 is arranged in the irregular gap 34, the first sealant bead 20 would fill the majority of the interface 10A. The second sealant bead 22 would then flow into adjacent gap irregularities and facilitate filling the irregular gap 34 generated by the uneven profile 32. The first and second sealant beads 20, 22, therefore, cooperate to seal the component assembly 10 as the sealant stack 24 is squeezed during fastening without generating sealant hydrolocking and/or distortion of interfacing components. Accordingly, the squeezing of the sealant stack 24 is intended to fully seal the interface 10A and deliver reliable leak-free performance of the component assembly 10.

Figure 5:
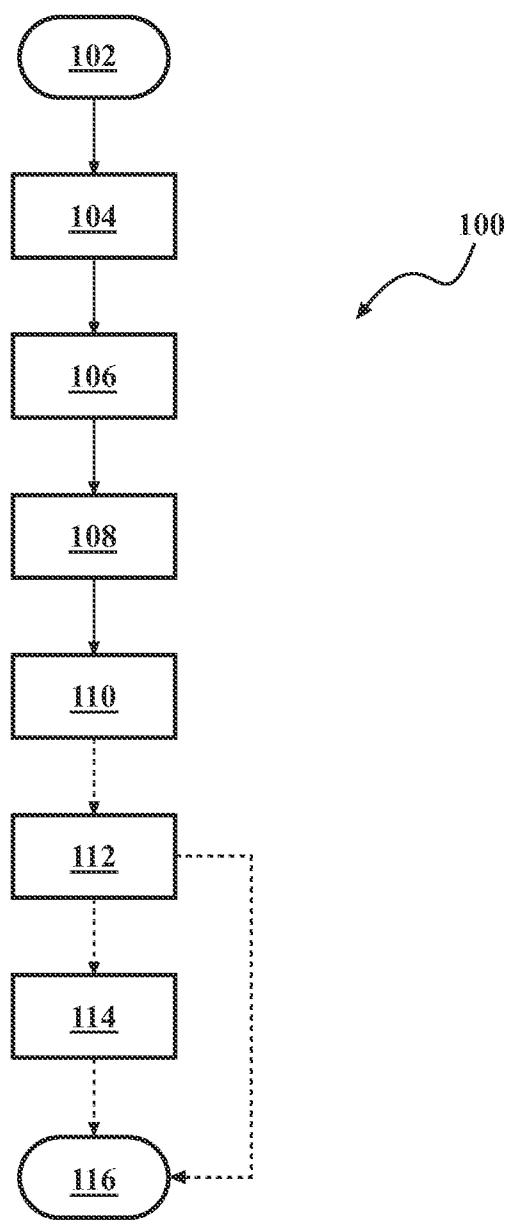
FIG. 5 illustrates a flowchart for a method of sealing the component assembly shown in FIGS. 1-4.

A method 100 of sealing a component assembly 10, such as an assembly that is part of an aircraft wing 16 having an aircraft wing skin and an aircraft wing spar and defining an internal fuel reservoir 18, is shown in FIG. 5 and described below with reference to the structure shown in FIGS. 1-4. Method 100 commences in frame 102 with providing the first component 12. Following frame 102, the method advances to frame 104. In frame 104, the method includes applying onto the first component 12 the first sealant bead 20. As described above, the first sealant bead 20, in a cross-sectional view, has the first width 20-1 and the first height 20-2, with the magnitude of the first width being greater than the magnitude of the first height.

As described above with respect to FIGS. 1-4, the first and second sealant bead 20, 22 may be formed from a common polymeric material, such as polysulfide. Also, the magnitude of the second sealant bead's width (the second width 22-1), as well as the proportion of the dimensions of the first and second sealant beads 20, 22 may be directly proportional to the viscosity of the sealant material. From frame 104, the method moves on to frame 106. In frame 106, the method includes applying over the first sealant bead 20 a second sealant bead 22 having, in the cross-sectional view, the second width 22-1 and the second height 22-2, and thereby generating the sealant stack 24. As described above relative to FIGS. 3 and 4, the sealant stack 24 applied to the first component 12 generates the component subassembly 10'. As described above, the second width 22-1 is equal to or smaller than the second height 22-2 and is smaller than the first width 20-1.

After frame 106, the method proceeds to frame 108. In frame 108, the method includes arranging over the generated sealant stack 24 the second component 14, such that the sealant stack is positioned between the first outer surface 12A and the second outer surface 14A. After frame 108, the method proceeds to frame 110. In frame 110, the method includes fastening the second component 14 to the first component 12 with the sealant stack 24 squeezed therebetween. Thus squeezed, the sealant stack 24 provides fluid-tight sealing of the component assembly 10 via rheological flow of the first and second sealant beads 20, 22. In the embodiment where the first and/or the second outer surfaces 12A, 14A are characterized by the previously described uneven profile 32, the resultant irregular gap 34 would be reliably filled between the first and second components 12, 14 by the squeezed sealant. As described above with respect to FIGS. 1-4, fastening the second component 14 to the first component 12 may include installing and tightening the first row 28' of fasteners on one side and the second row 30' of fasteners on the opposite side of the first sealant bead 20.

From frame 110, the method may advance to frame 112. In frame 112, the method includes cleaning up sealant material that may have been squeezed out of the fay-sealed interface 10A and, for example, from individual locations in the irregular gap 34. After frame 112, the method may advance to frame 114 for completion of the component assembly 10. Following either of the frames 112 or 114, the method may proceed to frame 116 for incorporation of the component assembly 10 into a greater assembly, such as the aircraft wing 16. Overall, method 100 is intended to generate a fluid-tight component assembly via two proportionately dissimilar stacked sealant beads, i.e., the sealant bead 22 applied over the first sealant bead 20, to generate the sealant stack 24. Such a fluid-tight interface is specifically formed via rheological flow of the first and sealant beads 20, 22. The above fluid-tight interface may be especially beneficial in constructing an aircraft wing having a joined aircraft wing spar and wing skin and configured to define a fuel reservoir.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method (100) of sealing a component assembly (10), comprising:

applying onto a first component a first sealant bead (20) having, in a cross-sectional view, a first width (20-1)

and a first height (20-2), wherein the first width is greater than the first height, wherein the first component (12) has a first outer surface (12A), wherein the component assembly (10) has a longitudinal axis (X) and wherein the first sealant bead (20) is arranged in a direction of the longitudinal axis (X);

applying over the first sealant bead a second sealant bead (22) having, in the cross-sectional view, a second width (22-1) and a second height (22-2), the second sealant bead (22) and the first sealant bead (20) forming a sealant stack (24), wherein the second sealant bead (22) is arranged in the direction of the longitudinal axis (X), wherein:
  the second width is equal to or smaller than the second height; and
  the second width is smaller than the first width;

arranging over the sealant stack a second component (14) having a second outer surface (14A), such that the sealant stack is positioned between the first outer surface and the second outer surface; and fastening the second component (14) to the first component (12) with a first row of fasteners (28) and a second row of fasteners (30) arranged passing through the second component (14), the first component (12), and the first sealant bead (20), wherein the first row of fasteners (28) and the second row of fasteners (30) is arranged in the direction of the longitudinal axis (X), wherein the first row of fasteners (28) is arranged on a first side of the second sealant bead (22) and the second row of fasteners (30) arranged on a second side, opposite the first side relative to the longitudinal axis (X), of the second sealant bead (22), wherein the fastening of the first row of fasteners (28) and the second row of fasteners (30) squeezes the sealant stack therebetween such that at least a portion of the sealant stack (24) is squeezed out of an interface (10A) between the second component (14) to the first component (12) and forms a fluid-tight seal between the second component (14) and the first component (12) via rheological flow of the first and second sealant beads.

2. The method of claim 1, wherein the first height is equal to or smaller than the second height.

3. The method of claim 1, wherein the first sealant bead and the second sealant bead are formed from a common polymeric material.

4. The method of claim 3, wherein the second width is directly proportional to viscosity of the polymeric material.

5. The method of claim 3, wherein the polymeric material is polysulfide.

6. The method of claim 1, wherein:
  at least one of the first and second outer surfaces is characterized by an uneven profile (32) thereby generating an irregular gap (34) between the first and second components;
  the sealant stack is arranged in the irregular gap; and
  the second sealant bead facilitates filling the irregular gap to seal the component assembly.

7. The method of claim 1, wherein the fluid-tight seal between the second component (14) and the first component (12) is characterized by an absence of redundant fillet and fairing seals between the first and second components.

8. The method of claim 1, wherein part of an aircraft wing (16) defining a fuel reservoir (18).

9. The method of claim 8, wherein the first component is one of an aircraft wing skin and an aircraft wing spar and the second component is the other of the aircraft wing skin and the aircraft wing spar.

10. The method (100) of claim 1, wherein at least one of the first component (12) and the second component (14) is characterized by an uneven profile (32), wherein the uneven profile (32) generates an irregular gap (34) between the first component (12) and the second component (14), and wherein the second sealant bead (22) flows into the irregular gap (34) to seal the component assembly (10) when the sealant stack (24) is squeezed.

11. A method (100) of sealing an aircraft wing (16) assembly defining a fuel reservoir (18), comprising:
  applying onto an aircraft wing skin (12) a first sealant bead (20) having, in a cross-sectional view, a first width (20-1) and a first height (20-2), wherein the first width is greater than the first height, wherein the aircraft wing skin (12) has a first outer surface (12A), wherein the aircraft wing (16) assembly has a longitudinal axis (X) and wherein the first sealant bead (20) is arranged in a direction of the longitudinal axis (X);
  applying over the first sealant bead a second sealant bead (22) having, in the cross-sectional view, a second width (22-1) and a second height (22-2), the second sealant bead (22) and the first sealant bead (20) forming a sealant stack (24)), wherein the second sealant bead (22) is arranged in the direction of the longitudinal axis (X), wherein:
    the second width is equal to or smaller than the second height; and
    the second width is smaller than the first width;
  arranging over the sealant stack an aircraft wing spar (14) having a second outer surface (14A), such that the sealant stack is positioned between the first outer surface and the second outer surface; and
  fastening the aircraft wing spar (14) to the aircraft wing skin (12) with a first row of fasteners (28) and a second row of fasteners (30) arranged passing through the aircraft wing spar (14), the aircraft wing skin (12), and the first sealant bead (20), wherein the first row of fasteners (28) and the second row of fasteners (30) is arranged in the direction of the longitudinal axis (X), wherein the first row of fasteners (28) is arranged on a first side of the second sealant bead (22) and the second row of fasteners (30) is arranged on a second side, opposite the first side relative to the longitudinal axis (X), of the second sealant bead (22), the fastening of the first row of fasteners (28) and the second row of fasteners (30) squeezing the sealant stack therebetween such that at least a portion of the sealant stack (24) is squeezed out of an interface (10A) between the aircraft wing spar (14) to the aircraft wing skin (12) and forming a fluid-tight seal between the aircraft wing spar (14) and the aircraft wing skin (12).

12. A fay-sealed component assembly (10), comprising:
  a first component (12) having a first outer surface (12A);
  a sealant stack (24) comprising:
    a first sealant bead (20) applied onto the first component, wherein the component assembly (10) has a longitudinal axis (X) and wherein the first sealant bead (20) is arranged in a direction of the longitudinal axis (X);
    a second sealant bead (22) applied over the first sealant bead, wherein the second sealant bead (22) is arranged in the direction of the longitudinal axis (X); and
  a second component (14) arranged over the sealant stack, wherein the second component includes a second outer surface (14A), such that the sealant stack is positioned between the first outer surface and the second outer surface;

a first row of fasteners (28) and a second row of fasteners (30) arranged passing through the second component (14), the first component (12), and the first sealant bead (20), wherein the first row of fasteners (28) and the second row of fasteners (30) is arranged in the direction of the longitudinal axis (X), wherein the first row of fasteners (28) is arranged on a first side of the second sealant bead (22) and the second row of fasteners (30) is arranged on a second side, opposite the first side, of the second sealant bead (22), and the first row of fasteners (28) and the second row of fasteners (30) fastening the second component (14) to the first component (12), wherein at least one of the first and second outer surfaces is characterized by an uneven profile (32), wherein in a first state, the first sealant bead (20) has a first height (20-2) and a first width (20-1), the second sealant bead (22) has a second height (22-2) and a second width (22-1), wherein the second width (22-1) is less than the first width (20-1) and less than a third width of an interface (10A) between the second component (14) to the first component (12), wherein the second height (22-2) is greater than the first height (20-2), and wherein in a second state, the first row of fasteners (28) and the second row of fasteners (30) compress the sealant stack (24) such that at least a portion of the sealant stack (24) is squeezed out of the interface (10A) and form a fluid-tight seal between the first component (12) and the second component (14).

13. The fay-sealed component assembly of claim 12, wherein the first sealant bead and the second sealant bead are formed from a common polymeric material.

14. The fay-sealed component assembly of claim 13, wherein a width (22-1) of the second sealant bead is directly proportional to viscosity of the polymeric material.

15. The fay-sealed component assembly of claim 13, wherein the polymeric material is polysulfide.

16. The fay-sealed component assembly of claim 12, wherein:

the uneven profile of the at least one of the first and second outer surfaces generates an irregular gap (34) between the first and second components;

the sealant stack is arranged in the irregular gap; and the second sealant bead facilitates filling the irregular gap to seal the component assembly.

17. The fay-sealed component assembly of claim 12, wherein the fluid-tight seal between the second component (14) and the first component (12) is characterized by an absence of redundant fillet and fairing seals between the first and second components.

18. The fay-sealed component assembly of claim 12, wherein the component assembly is part of an aircraft wing (16) defining a fuel reservoir (18), and wherein the first component is one of an aircraft wing skin and an aircraft wing spar and the second component is the other of the aircraft wing skin and the aircraft wing spar.

19. A component subassembly (10'), comprising:

a first component (12) having a first outer surface (12A);

a sealant stack (24) comprising:

a first sealant bead (20) applied onto the first component, wherein, in a cross-sectional view, the first sealant bead is defined by a first width (20-1) and a first height (20-2), and wherein the first width is greater than the first height, wherein the component subassembly (10') has a longitudinal axis (X) and wherein the first sealant bead (20) is arranged in a direction of the longitudinal axis (X);

a second sealant bead (22) applied over the first sealant bead, wherein the second sealant bead (22) is arranged in the direction of the longitudinal axis (X), wherein in the cross-sectional view, the second sealant bead is defined by a second width (22-1) and a second height (22-2), wherein the second width is equal to or smaller than the second height, wherein the second width is smaller than the first width;

a second component (14) arranged relative to the sealant stack and having a second outer surface (14A); and a first row of fasteners (28) and a second row of fasteners (30) arranged passing through the second component (14), the first component (12), and the first sealant bead (20), wherein the first row of fasteners (28) and the second row of fasteners (30) is arranged in the direction of the longitudinal axis (X), wherein the first row of fasteners (28) is arranged on a first side of the second sealant bead (22) and the second row of fasteners (30) is arranged on a second side, opposite the first side relative to the longitudinal axis (X), of the second sealant bead (22), wherein the first row of fasteners (28) and the second row of fasteners (30) fasten the second component (14) to the first component (12), wherein the first row of fasteners (28) and the second row of fasteners (30) compress the sealant stack (24) such that at least a portion of the sealant stack (24) is squeezed out of an interface (10A) between the second component (14) to the first component (12) and form a fluid-tight seal between the first component (12) and the second component (14).

20. The component subassembly of claim 19, wherein the first height is equal to or smaller than the second height.

21. The component subassembly of claim 19, wherein the first sealant bead and the second sealant bead are formed from a common polymeric material.

22. The component subassembly of claim 21, wherein the second width is directly proportional to viscosity of the polymeric material.

23. The component subassembly of claim 21, wherein the polymeric material is polysulfide.

* * * * *